No. 652,862. Patented July 3, 1900.
H. H. PORTER.
WHEEL.
(Application filed Mar. 6, 1900.)

(No Model.)

Witnesses:
S. A. Earl
Otis A. Earl

Inventor,
Henry H. Porter
By Fred L. Chappell
Att'y.

United States Patent Office.

HENRY H. PORTER, OF DOWAGIAC, MICHIGAN.

WHEEL.

SPECIFICATION forming part of Letters Patent No. 652,862, dated July 3, 1900.

Application filed March 6, 1900. Serial No. 7,606. (No model.)

*To all whom it may concern:*

Be it known that I, HENRY H. PORTER, a citizen of the United States, residing at the city of Dowagiac, in the county of Cass and State of Michigan, have invented certain new and useful Improvements in Wheels, of which the following is a specification.

This invention relates to improvements in wheels having cushion or solid-rubber tires, and particularly to improvements in this class of wheels having metal spokes.

One object of the invention is to provide an improved construction of wheel wherein all of the parts are rigidly and positively secured together and that too in such a manner that the wheel will be very strong to resist any lateral strains and will remain true and perfect in form in use and will be very strong.

Further minor objects will definitely appear in the detailed description to follow.

I accomplish the objects of my invention by the devices and means described in this specification.

The invention is clearly defined and pointed out in the claims.

A wheel embodying the features of my invention is fully illustrated in the accompanying drawings, forming a part of this specification, in which—

Figure 1:
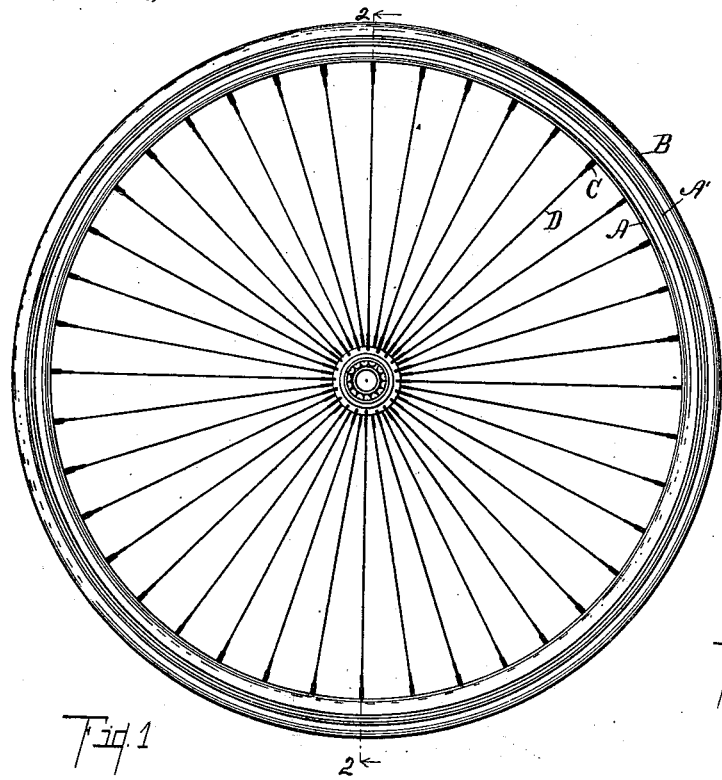
Figure 2:
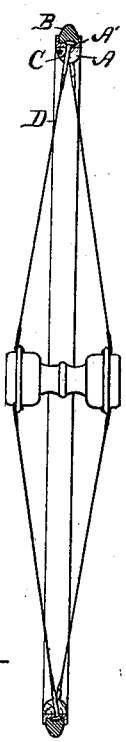
Figure 3:
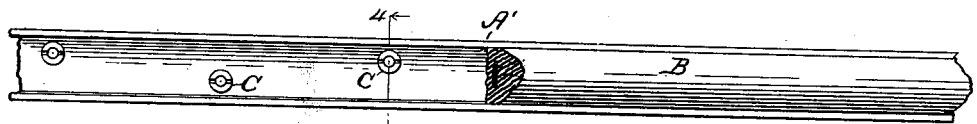
Figure 4:
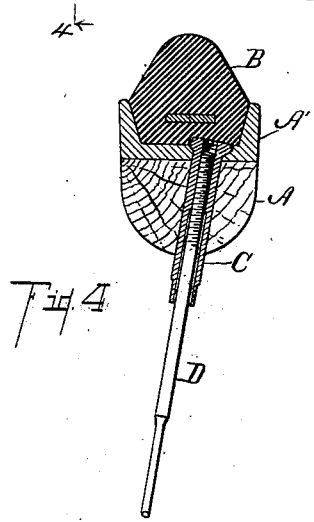

Figure 1 is a side elevation of a wheel embodying my invention. Fig. 2 is a view, partially in section, taken on line 2 2 of Fig. 1, the hub being shown in full lines. Fig. 3 is an enlarged detail view of the outer rim of the wheel, a portion of the tire being broken away to show details of the construction. Fig. 4 is an enlarged detail transverse sectional view taken on a line corresponding to line 4 4 of Fig. 3, showing the attachment of the spokes to the wheel-rim and the arrangement of the parts.

In the drawings all of the sectional views are taken looking in the direction of the little arrows at the ends of the section-lines, and similar letters of reference refer to similar parts throughout the several views.

In the drawings, A represents a wooden felly. On this wooden felly is set by suitable means a channel-shaped tire A', of steel or other suitable metal, which forms a peripheral groove around the outside of the wheel. Spokes D are attached by suitable nipples C to the felly and tire at the outer end and by a suitable hook or other connection to the hub at the center. The nipple C extends from the outside of the tire A' through the wooden felly A and serves to positively join these two parts together. This connection, however, serves the further purpose of spoke and connection therefor, and the spoke might be said to serve the additional function of the bolt between the parts. The ends are exposed within the channel. The cushion or solid-rubber tire B is then placed in the grooved tire A' and serves to protect the parts. The cushion is attached in any well-known way. By this arrangement the wheel is made very strong. The channeled tire A' is bolstered and supported by the felly back of it. These parts are retained positively together at very short intervals by the spoke connections, and these connections are in turn protected by the elastic cushion or solid-rubber tire, thus effecting a combination in which each of the parts coacts with the other to secure all of the advantages pertaining to each and the additional advantage of a perfectly-formed wheel of great durability and strength. It is desired to remark in this connection that if the wooden felly A were omitted the tire A' would soon become injured and bent and that if the spokes were connected to the wooden felly alone the constant tendency of the strain upon it would be to separate it from the tire and cause looseness at that point, and so become separated and injured by lateral strains. Further, if the spokes were merely connected to the wooden felly when strong lateral strains were brought upon the hub, owing to the smallness of the connection, the same would become loosened; but by uniting the parts, as shown, each supports the other, making a perfect wheel, and the whole, as before remarked, is protected by the cushion or solid-rubber tire B from receiving blows that would cause local injuries to the tire and its felly. The wheel, shaped as shown, presents a satisfactory cushion-surface which is at the same time narrow. The parts are so formed as not to retain mud and dirt upon the wheel.

Having thus described the parts and arrangement of parts of my improved wheel, I desire to state that the structure can be considerably varied without departing from my invention. The tire could be made in a different form and the cushion might be otherwise secured in position and different devices and means might be used for attaching the spokes through the felly and tire and still accomplish the valuable results of my invention. The particular form that I have shown is believed to possess great merit over any other construction, and I therefore wish it understood that I claim the parts specifically as well as the broad invention exemplified in the structure.

Having thus described my invention, what I claim as new, and desire to secure by Letters Patent, is—

1. In a wheel the combination of the wooden felly A; the channel-shaped tire A' set upon the same and forming a peripheral groove; wire spokes having a connection C at their outer ends extending through the felly and the channel-shaped tire A' to apply tension and connect them securely together; and a cushion or solid-rubber tire B in the peripheral groove of the channel-shaped tire, to protect the outer ends of the connections all coacting substantially as described for the purpose specified.

2. In a wheel the combination of a suitable felly of wood; a channel-shaped metal tire on said felly forming a peripheral groove around the wheel; wire spokes having connections at their outer ends extending through the felly and the channel-shaped tire to connect them securely together; and a cushion or solid-rubber tire within the peripheral groove formed by the channel-shaped tire to protect the connections, for the purpose specified.

3. In a wheel, the combination of a felly of wood; a metal tire; wire spokes having connections at their outer ends which extend through the felly and the metal tire to connect them securely together; and a cushion or solid-rubber tire outside of the metal tire to protect the connections, for the purpose specified.

In witness whereof I have hereunto set my hand and seal in the presence of two witnesses.

HENRY H. PORTER. [L. S.]

Witnesses:
S. A. EARL,
OTIS A. EARL.